(12) United States Patent
Taguchi (10) Patent No.: US 8,794,366 B2
(45) Date of Patent: Aug. 5, 2014

(54) BATTERY CASE STRUCTURE FOR MOTORCYCLE

(71) Applicant: Honda Motor Co., Ltd., Tokyo (JP)

(72) Inventor: Kiyotaka Taguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/915,816

(22) Filed: Jun. 12, 2013

(65) Prior Publication Data
US 2014/0014427 A1     Jan. 16, 2014

(30) Foreign Application Priority Data

Jul. 10, 2012   (JP) .................................. 2012-154316

(51) Int. Cl.
*B60R 16/04* (2006.01)
*H01M 2/10* (2006.01)

(52) U.S. Cl.
CPC ............. *B60R 16/04* (2013.01); *H01M 2/1083* (2013.01)
USPC ........................................................ 180/68.5

(58) Field of Classification Search
USPC ................................................. 180/68.5, 220
See application file for complete search history.

(56) References Cited

U.S. PATENT DOCUMENTS

| 7,210,550 B2 * | 5/2007 | Yonehana et al. ............. 180/220 |
| 7,604,078 B2 * | 10/2009 | Okamoto et al. .......... 180/206.1 |
| 7,931,110 B2 * | 4/2011 | Nishiura et al. .............. 180/220 |
| 8,002,067 B2 * | 8/2011 | Nishiura et al. .............. 180/220 |

FOREIGN PATENT DOCUMENTS

JP          2011-063179 A      3/2011

* cited by examiner

*Primary Examiner* — John Walters
*Assistant Examiner* — James Triggs
(74) *Attorney, Agent, or Firm* — Squire Patton Boggs (US) LLP (57) ABSTRACT

A battery case structure for a motorcycle can include a battery case for storing therein a battery to be mounted in a motorcycle, and a starter relay and a fuse box as related parts which can be connected to the battery. A starter relay mounting portion and a fuse box mounting portion in which the starter relay and the fuse box are disposed relative to the battery case are provided. A sub-case is disposed near the battery on an inside of a battery case main unit. The sub-case includes the starter relay mounting portion and the fuse box mounting portion.

10 Claims, 11 Drawing Sheets

BATTERY CASE STRUCTURE FOR MOTORCYCLE

BACKGROUND

1. Field

The present invention relates to a battery case structure for a motorcycle, capable of storing therein battery-related parts as well as a battery.

2. Description of the Related Art

Motorcycles include a battery mounted thereon via a battery case and the battery case very often store therein battery-related parts. The battery-related parts are connected to the battery and thus disposed near the battery in consideration of a wiring length and wiring work.

A known battery case structure for a motorcycle is disclosed in Patent Document 1 (Japanese Patent Laid-Open No. 2011-63179).

The battery case structure disclosed in Patent Document 1 has a battery storage section formed as part of an article storage box. A battery is mounted at a front portion of the battery storage section. The battery storage section includes an electrical part storage section disposed rearwardly of the battery. A starter relay, a fuse, and other electrical parts are mounted as the battery-related parts in the electrical part storage section.

In the battery case structure disclosed in Patent Document 1, the battery and the electrical parts are mounted as follows. Specifically, the battery is first mounted in the battery storage section and the starter relay, the fuse, and other electrical parts are next individually mounted in the electrical part storage section near the battery; then, the battery is connected to the electrical parts and the electrical parts are then connected to each other. Therefore mounting of the parts requires time and labor. Considering such time and labor, a need thus exists for a simplified mounting procedure.

SUMMARY

The present invention has been made in view of the foregoing situation. It is an object of the present invention to provide a battery case structure for a motorcycle, allowing the battery-related parts to be disposed near a battery and thereby achieving a simplified mounting procedure for battery-related parts.

To solve the foregoing problem, an embodiment of the present invention provides a battery case structure for a motorcycle, including a battery case for storing therein a battery to be mounted in a motorcycle. Related parts, such as a relay, are connected to the battery, and related parts mounting portions are provided in which the related parts are disposed relative to the battery case. A sub-case is disposed near the battery on an inside of a main unit of the battery case; the sub-case includes the related parts mounting portions.

In this arrangement, the sub-case includes the related parts mounting portions for mounting therein the related parts, such as a relay. This allows the related parts to be previously subassembled in the sub-case and then the subassembled sub-case to be mounted in the main unit of the battery case to thereby complete wire connection and other work. A structure that simplifies mounting of the related parts, while disposing the related parts close to the battery, can thus be provided.

In the foregoing aspect, the main unit of the battery case can have inner walls configured such that outer walls of the sub-case contact the inner walls. This can enable a connecting hole in the sub-case and a connecting hole in the main unit to be aligned with each other. This arrangement can facilitate, during a manufacturing process, positioning of the sub-case relative to the main unit of the battery case. The arrangement can also allow the main unit of the battery case and the sub-case to be fastened to each other by inserting, for example, a screw into the connecting holes immediately following the positioning of the sub-case relative to the main unit of the battery case, which contributes to easy manufacturing.

In the foregoing embodiment, the sub-case can be disposed upwardly of the battery in the main unit of the battery case. This arrangement disposes the heavy battery at a lower portion in the battery case, achieving a lower center of gravity of the motorcycle.

In the foregoing embodiment, the battery case can be disposed downwardly of a seating portion. This arrangement allows the heavy battery to be disposed at the center of the motorcycle, thus integrating mass.

In the foregoing embodiment, the sub-case can include the related parts mounting portions such that the related parts mounting portions extend along inner wall surfaces of the main unit of the battery case. This arrangement allows connection among multiple related parts to be simplified and the sub-case to be positioned easily relative to the main unit of the battery case.

In the foregoing aspect, the battery case can be disposed in a first space sandwiched between a seat frame extending longitudinally for supporting the seating portion and a rear frame extending upwardly in a rearward direction from a downward position of the motorcycle. The sub-case is disposed in a triangular second space defined by the seat frame, the rear frame, and the battery within the battery case. In these arrangements, the first space sandwiched between the seat frame and the rear frame forms a triangular shape and the first space is typically a dead space. Disposing the battery case in the first space is preferable for a motorcycle in which a disposition space is at a premium. Moreover, disposing the sub-case in the triangular second space that is left after the battery has been disposed in the main unit of the battery case permits effective use of the dead space.

In the embodiment of the present invention, the sub-case that includes the related parts mounting portions and that is disposed near the battery is disposed on the inside of the main unit of the battery case. The arrangement in which the sub-case includes the related parts mounting portions for mounting therein the related parts, such as a relay, allows the related parts to be previously subassembled in the sub-case and then the subassembled sub-case to be mounted in the main unit of the battery case to thereby complete wire connection and other work. A structure that simplifies mounting of the related parts, while disposing the related parts close to the battery, can thus be provided.

The main unit of the battery case has the inner walls configured such that outer walls of the sub-case contact the inner walls to thereby enable the connecting hole in the sub-case and the connecting hole in the main unit to be aligned with each other. This arrangement facilitates, during the manufacturing process, positioning of the sub-case relative to the main unit of the battery case. The arrangement also allows the main unit of the battery case and the sub-case to be fastened to each other by inserting, for example, the screw into the connecting holes immediately following the positioning of the sub-case relative to the main unit of the battery case, which contributes to easy manufacturing.

Additionally, the sub-case is disposed upwardly of the battery in the main unit of the battery case. This arrangement disposes the heavy battery at a lower portion in the battery case, achieving a low center of gravity of the motorcycle.

Additionally, the battery case is disposed downwardly of the seating portion. This arrangement allows the heavy battery to be disposed at the center of the motorcycle, thus integrating mass.

Additionally, the sub-case includes the related parts mounting portions such that the related parts mounting portions extend along the inner wall surfaces of the main unit of the battery case. This arrangement allows connection among multiple related parts to be simplified and the sub-case to be positioned easily relative to the main unit of the battery case.

The battery case is disposed in the first space sandwiched between the seat frame extending longitudinally for supporting the seating portion and the rear frame extending upwardly in the rearward direction from a downward position of the motorcycle. The sub-case is disposed in the triangular second space defined by the seat frame, the rear frame, and the battery within the battery case. In these arrangements, the first space sandwiched between the seat frame and the rear frame forms a triangular shape and the first space is typically a dead space. Disposing the battery case in the first space such as that described above is preferable for a motorcycle in which the disposition space is at a premium. Moreover, disposing the sub-case in the triangular second space that is left after the battery has been disposed in the main unit of the battery case permits effective use of the dead space.

DETAILED DESCRIPTION

Embodiments to which the present invention is applied will be described below with reference to the accompanying drawings. Throughout the descriptions given hereunder, longitudinal, lateral, and vertical directions are relative to the vehicle body unless otherwise specified. In the drawings, an arrow FR denotes a vehicle forward direction, an arrow UP denotes a vehicle upward direction, and an arrow LE denotes a vehicle leftward direction, respectively.

Figure 1:
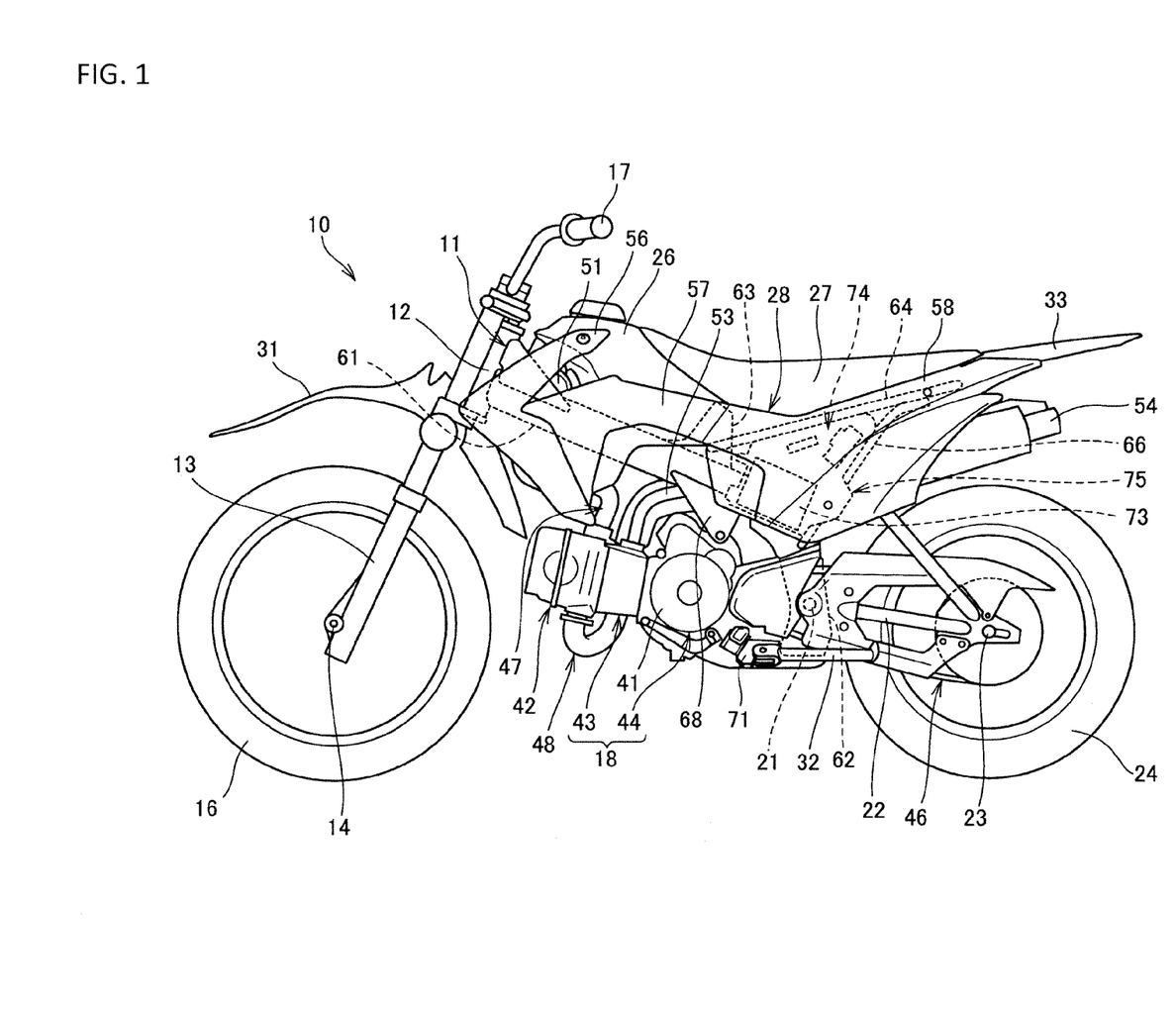
FIG. 1 is a left side elevational view showing a motorcycle including a battery case structure according to an embodiment of the present invention.

FIG. 1 is a left side elevational view showing a motorcycle 10 that includes a battery case structure according to a first embodiment of the present invention.

The motorcycle 10 is a saddle riding type vehicle including mainly a vehicle body frame 11, a front fork 13, a front wheel 16, a handlebar 17, a power unit 18, a swing arm 22, a rear wheel 24, a fuel tank 26, a seat 27, and a vehicle body cover 28. The vehicle body frame 11 is, in this example, a framework of the motorcycle 10. The front fork 13 is laterally steerably mounted on a head pipe 12 that forms part of a front end portion of the vehicle body frame 11. The front wheel 16 is mounted at a lower end of the front fork 13 via an axle 14. The handlebar 17 is mounted on an upper end portion of the front fork 13. The power unit 18 is mounted at a lower portion of the vehicle body frame 11. The swing arm 22 is vertically swingably mounted at the lower portion of the vehicle body frame 11 via a pivot shaft 21. The rear wheel 24 is mounted at a rear end portion of the swing arm 22 via an axle 23. The fuel tank 26 and the seat 27 are mounted in tandem on an upper portion of the vehicle body frame 11. The vehicle body cover 28 covers the upper portion of the vehicle body frame 11 from sides.

In FIG. 1, reference numeral 31 denotes a front fender that covers the front wheel 16 from above, reference numeral 32 denotes a side stand, and reference numeral 33 denotes a rear fender that covers the rear wheel 24 from above.

The power unit 18 includes an engine 43 and a transmission 44. The engine 43 includes a crankcase 41 from which a cylinder portion 42 extends substantially forwardly. The transmission 44 is integrated with a rear portion of the engine 43. Power is transmitted to the rear wheel 24 from an output shaft of the transmission 44 via a chain drive transmission mechanism 46.

The cylinder portion 42 of the engine 43 has an upper portion connected to an intake system 47 and a lower portion connected to an exhaust system 48. In FIG. 1, reference numeral 51 denotes an air cleaner that forms part of the intake system 47 and reference numerals 53 and 54 denote an exhaust pipe and a muffler, respectively, constituting the exhaust system 48.

The vehicle body cover 28 includes a pair of left and right front shrouds 56, 56 (only reference numeral 56 representing the front shrouds on the side closer to the viewer of FIG. 1 is shown), a pair of left and right front side covers 57, 57 (only reference numeral 57 representing the front side cover on the side closer to the viewer of FIG. 1 is shown), and a pair of left and right rear side covers 58, 58 (only reference numeral 58 representing the rear side cover on the side closer to the viewer of FIG. 1 is shown). The front shrouds 56, 56 cover an upper portion of the front fork 13 from both lateral sides and rear. The front side covers 57, 57 extend rearwardly along lateral sides of lower portions of the fuel tank 26 so as to join the front shrouds 56, 56. The rear side covers 58, 58 extend rearwardly along lateral sides of the seat 27 so as to join the front side covers 57, 57.

The vehicle body frame 11 includes the head pipe 12, a single main frame 61, a pair of left and right pivot plates 62, 62 (only reference numeral 62 representing the pivot plate on the side closer to the viewer of FIG. 1 is shown), a pair of left and right seat frames 64, 64 (only reference numeral 64 representing the seat frame on the side closer to the viewer of FIG. 1 is shown), and a pair of left and right rear frames 66, 66 (only reference numeral 66 representing the rear frame on the side closer to the viewer of FIG. 1 is shown). The main frame 61 extends obliquely downwardly toward the rear from the head pipe 12. The pivot plates 62, 62 extend downwardly from a rear end portion of the main frame 61. The seat frames 64, 64 extend obliquely upwardly toward the rear from a cushion bracket 63 mounted on an upper portion of a rear portion of the main frame 61. The rear frames 66, 66 extend obliquely upwardly toward the rear from the pivot plates 62, 62 and are connected to rear ends of the seat frames 64, 64.

An engine hanger 68 that supports the power unit 18 is mounted on a lower portion of the rear portion of the main frame 61. The pivot shaft 21 and a stand bracket 71 for supporting the side stand 32 are mounted on the pivot plates 62, 62. A rear cushion unit (not shown) having a rear end portion mounted on the swing arm 22 has an upper end portion mounted on the cushion bracket 63. The seat frames 64, 64 support the seat 27 as a seating portion.

A battery case 75 in which a battery 73 and battery-related parts 74 associated with the battery 73 are mounted is disposed on the inside in a vehicle width direction of the left rear side cover 58.

Figure 2:
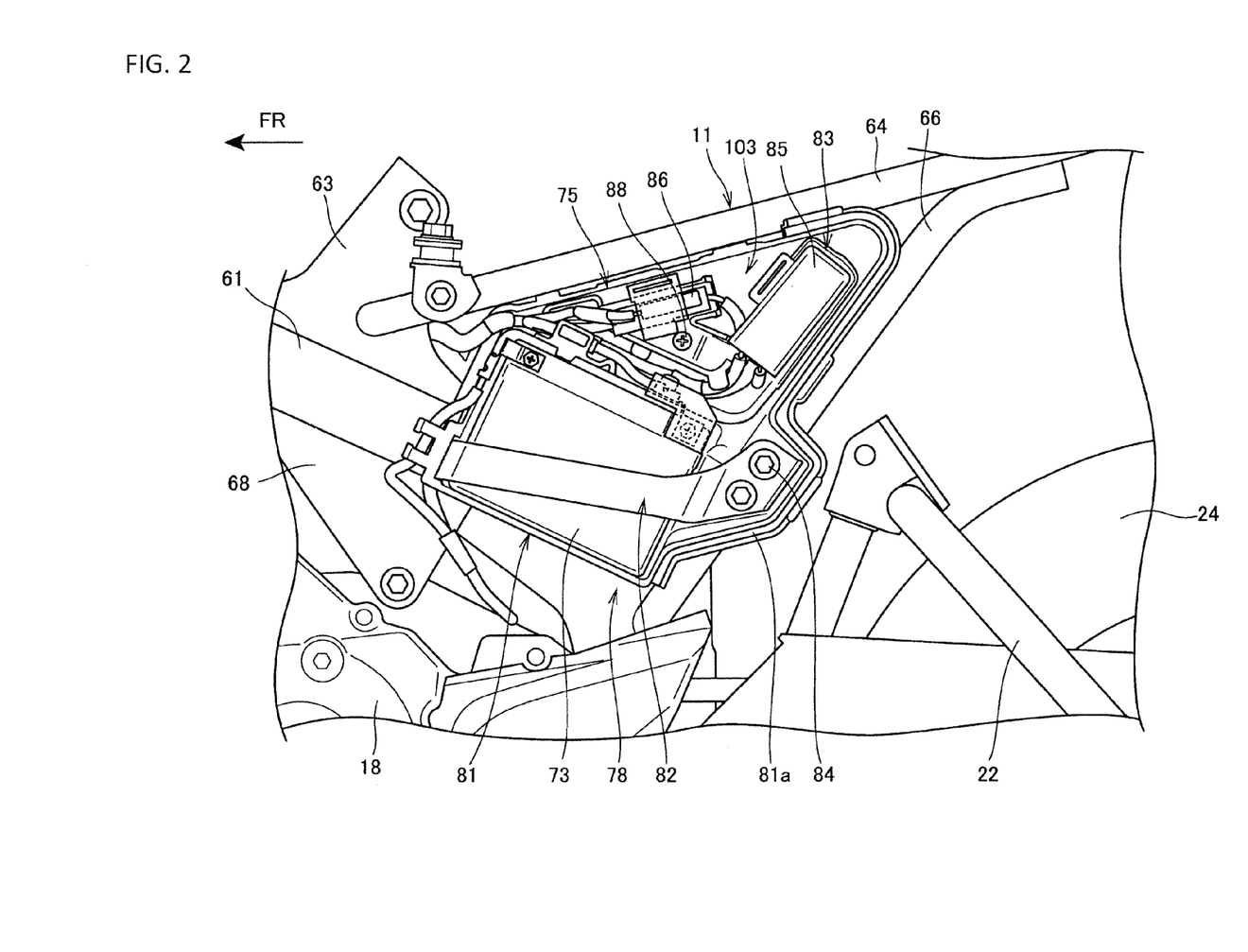
FIG. 2 is a side elevational view of an example of a main section showing a condition of a battery case mounted in a vehicle body.

FIG. 2 is a side elevational view of a main section showing a condition of the battery case 75 mounted in the vehicle body.

The battery case 75 is disposed downwardly of the seat 27 (see FIG. 1), specifically, a rider seated in the seat 27. Alternatively, the battery case 75 is disposed in a first space 78 sandwiched between the seat frames 64 and the rear frames 66. It is to be noted that a tab portion 81a disposed at a rear portion of the battery case 75 protrudes rearwardly from the rear frame 66 and is thus disposed outside the first space 78.

The battery case 75 includes a battery case main unit 81, a battery fixing bracket 82 that fixes the battery 73 housed in the battery case main unit 81, and a sub-case 83 for fixing the battery-related parts 74 in the battery case main unit 81.

Figure 3:
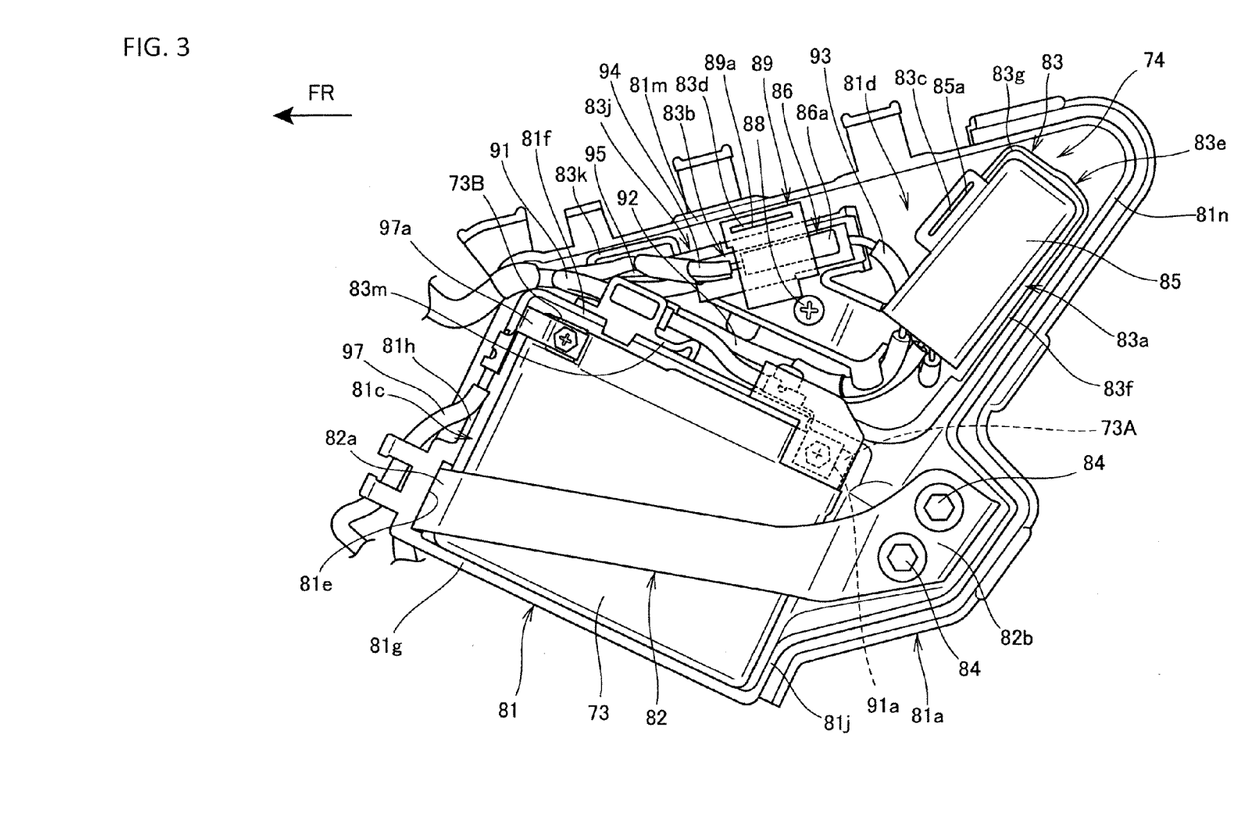
FIG. 3 is a side elevational view showing an embodiment of the battery case.

FIG. 3 is a side elevational view showing the battery case 75.

The battery case main unit 81 includes a battery storage section 81c, a battery-related parts storage section 81d, and the tab portion 81a. Specifically, the battery storage section 81c having a rectangular shape in a side view stores therein the battery 73. The battery-related parts storage section 81d having a triangular shape in a side shape is disposed obliquely upwardly of the battery storage section 81c. The battery-related parts storage section 81d stores therein the battery-related parts 74 via the sub-case 83. The tab portion 81a is used for mounting a rear portion of the battery case main unit 81 to the rear frame 66 (see FIG. 2).

The battery storage section 81c has an upper wall 81f, a lower wall 81g, a front wall 81h, and a rear wall 81j as four walls surrounding the battery 73. The battery-related parts storage section 81d has an upper wall 81m and a rear wall 81n that correspond to two sides of the triangle surrounding the sub-case 83 with the upper wall 81f of the battery storage section 81c. The upper wall 81m of the battery-related parts storage section 81d described above is disposed along the seat frame 64 (see FIG. 2) and the rear wall 81n of the battery-related parts storage section 81d described above is disposed along the rear frame 66 (see FIG. 2).

The battery fixing bracket 82 is a band-shaped member including a front end engaging portion 82a and a rear end fastening portion 82b. The front end engaging portion 82a engages an engaged portion 81e disposed at a lower portion of a front portion of the battery storage section 81c. The rear end fastening portion 82b is fastened jointly with the tab portion 81a of the battery case main unit 81 when the tab portion 81a is attached to the rear frame 66 using two bolts 84, 84. The battery fixing bracket 82 holds an outer side of the battery 73 so as to prevent the battery 73 from jumping out of the battery storage section 81c.

The sub-case 83 is a part in which a starter relay 85 and a fuse box 86 as the battery-related parts 74 of the battery 73 are mounted. The sub-case 83 includes a starter relay mounting portion 83a in which the starter relay 85 is mounted and a fuse box mounting portion 83b in which the fuse box 86 is mounted. The sub-case 83 is fixed inside the battery-related parts storage section 81d using a screw 88. The starter relay mounting portion 83a has a first protrusion 83c formed integrally therewith. The first protrusion 83c is inserted into a slit 85a in the starter relay 85 to thereby fix the starter relay 85 in place. The fuse box mounting portion 83b has a second protrusion 83d formed integrally therewith. The second protrusion 83d is inserted into a slit 89a in a holding member 89 for holding the fuse box 86 to thereby fix the fuse box 86 in place via the holding member 89.

An outer edge portion of the sub-case 83, specifically, a rear portion outer wall portion 83f and an upper portion corner portion 83g of an outer wall portion 83e disposed so as to surround the starter relay 85 in the starter relay mounting portion 83a are disposed so as to be close to the rear wall 81n and the upper wall 81m, respectively, disposed at the battery-related parts storage section 81d of the battery case main unit 81. The rear portion outer wall portion 83f, in particular, is disposed along the rear wall 81n.

Another outer edge portion of the sub-case 83, specifically, an upper portion outer wall portion 83k of an outer wall portion 83j disposed so as to surround the fuse box 86 in the fuse box mounting portion 83b is disposed so as to extend along and be close to the upper wall 81m disposed on the battery-related parts storage section 81d of the battery case main unit 81.

A lower portion outer wall portion 83m as still another outer edge portion of the sub-case 83 is disposed so as to extend along and be close to the upper wall 81f of the battery storage section 81c.

The rear portion outer wall portion 83f, the upper portion corner portion 83g, the upper portion outer wall portion 83k, and the lower portion outer wall portion 83m of the sub-case 83 are close to the upper wall 81f of the battery storage section 81c, and the upper wall 81m and the rear wall 81n of the battery-related parts storage section 81d, the upper wall 81f, the upper wall 81m, and the rear wall 81n corresponding to the three sides of the triangle. The upper wall 81f, the upper wall 81m, and the rear wall 81n thus position the sub-case 83 in a direction extending along a plane parallel with the paper surface. To state the foregoing differently, the sub-case 83 is positioned within the battery-related parts storage section 81d. Consequently, the sub-case 83 can be fastened to the battery case main unit 81 with the single screw 88.

The battery 73 has a positive terminal 73A and a negative terminal 73B at an upper portion thereof. A starter motor (not shown) is connected to the positive terminal 73A via the starter relay 85. A starter switch (not shown) is connected to the positive terminal 73A via the fuse box 86.

The negative terminal 73B is connected to the side of the crankcase 41 (see FIG. 1) of the power unit 18. In FIG. 3, reference symbol 86a denotes a blade fuse mounted in the fuse box 86; reference numerals 91 to 95 denote conducting wires connected to the sides of the positive terminal 73A, the starter relay 85, and the fuse box 86; reference symbol 91a denotes a positive connection terminal disposed at an end portion of the conducting wire 91 for connection to the positive terminal 73A; reference numeral 97 denotes a conducting wire connected to the side of the negative terminal 73B; and reference symbol 97a denotes a negative connection terminal disposed at an end portion of the conducting wire 97 for connection to the negative terminal 73B.

Figure 4:
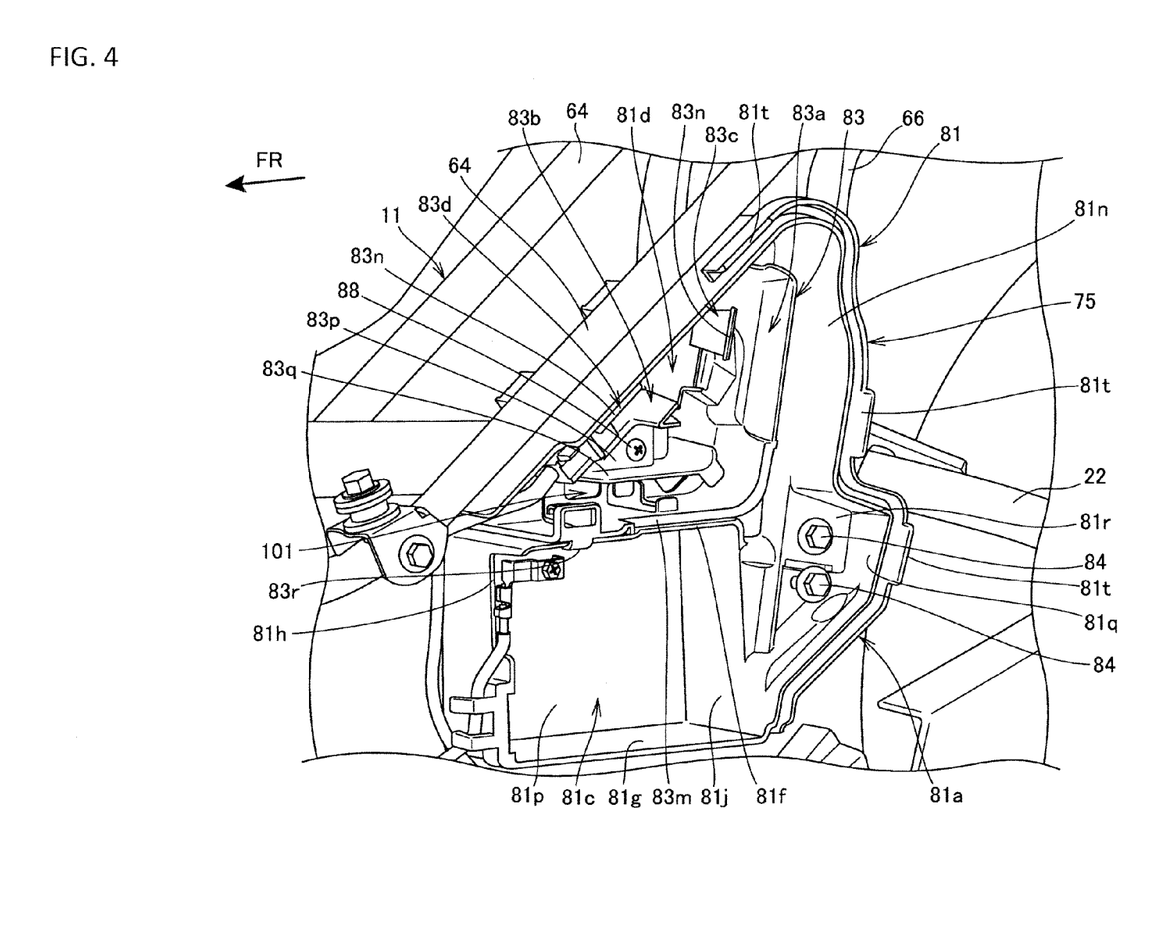
FIG. 4 is a perspective view showing an embodiment of a mounting condition of a battery case main unit and a sub-case.

FIG. 4 is a perspective view showing a mounting condition of the battery case main unit 81 and the sub-case 83, in which the battery, the battery-related parts, and their wires are removed from the battery case 75.

The battery storage section 81c is a box-shaped portion having a bottom wall 81p disposed inwardly in the vehicle width direction of, and integrated with, the upper wall 81f, the lower wall 81g, the front wall 81h, and the rear wall 81j.

The tab portion 81a of the battery case main unit 81 has a tab portion wall portion 81q and a tab portion bottom wall portion 81r. The tab portion wall portion 81q joins part of the rear wall 81j of the battery storage section 81c and the rear wall 81n of the battery-related parts storage section 81d and is bent so as to surround the two bolts 84, 84 that pass through the tab portion bottom wall portion 81r. A first one (upper one) of the two bolts 84, 84 fastens the tab portion 81a to the rear frame 66 (see FIG. 2) and a second one (lower one) of the two bolts 84, 84 fastens the rear side cover 58 (see FIG. 1) as part of the vehicle body cover and the tab portion 81a jointly to the rear frame 66.

In the sub-case 83, the starter relay mounting portion 83a and the fuse box mounting portion 83b each have a part recessed inwardly in the vehicle body. The first protrusion 83c is disposed at a front portion of the starter relay mounting portion 83a and the second protrusion 83d is disposed at an upper portion of the fuse box mounting portion 83b. The first protrusion 83c and the second protrusion 83d each have a wide-width portion 83n integrally formed at a leading end. The wide-width portion 83n prevents the starter relay 85 (see FIG. 3) and the fuse box 86 (see FIG. 3) from coming off easily from the first protrusion 83c and the second protrusion 83d, respectively.

A bottom wall 83p of the sub-case 83 fastened with the screw 88 to the side of the battery case main unit 81 includes an intermediate wall portion 83q disposed downwardly of the screw 88 and extending along the lower portion outer wall portion 83m. A wire passing space 101 for passing wires is formed between the lower portion outer wall portion 83m and the intermediate wall portion 83q.

A hook portion 83r that once extends downwardly and then further extends inwardly in the vehicle body is integrally formed with the lower portion outer wall portion 83m. Hooking this hook portion 83r onto the upper wall 81f of the battery case main unit 81 positions the sub-case 83 relative to the battery case main unit 81 and prevents the sub-case 83 from oscillating.

Figure 5:
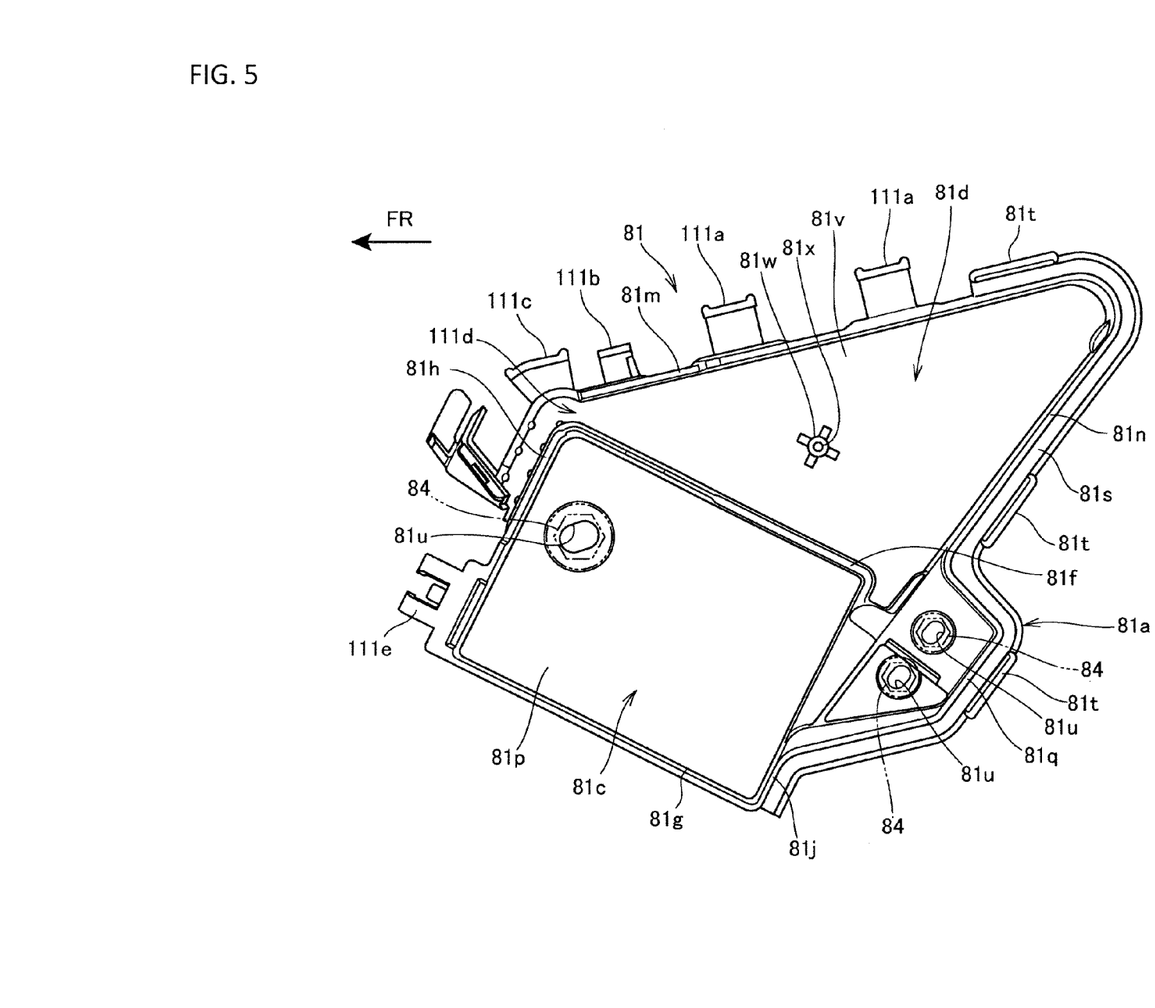
FIG. 5 is a side elevational view showing an example of the battery case main unit.

FIG. 5 is a side elevational view showing the battery case main unit 81.

The bottom wall 81p of the battery storage section 81c and the tab portion 81a have bolt pass-through holes 81u through which the bolt 84 is passed. The bolt 84 that is passed through the bolt pass-through hole 81u in the bottom wall 81p is threadedly connected to the side of the vehicle body frame 11 (see FIG. 1).

A bottom wall 81v of the battery-related parts storage section 81d has a boss portion 81w formed at a substantially center portion thereof. The screw 88 (see FIG. 3) is threaded into a screw hole 81x formed in the boss portion 81w, which causes the sub-case 83 (see FIG. 3) to be fastened to the battery case main unit 81.

A flange portion 81s is integrally formed so as to connect together the upper wall 81m, the rear wall 81n, the tab portion wall portion 81q, and the rear wall 81j of the battery case main unit 81. A plurality of lateral protrusions 81t protruding laterally (in a direction closer to the viewer of FIG. 5) is formed on the flange portion 81s.

In FIGS. 1 and 4, when the rear side cover 58 and the battery case main unit 81 are fastened jointly to the rear frame 66 with the bolts 84, the lateral protrusions 81t abut on or engage an inner surface of the rear side cover 58 to thereby position the rear side cover 58 in the vehicle width direction. It is noted that, in FIG. 5, reference symbols 111a, 111b, 111c denote upward protrusions protruding integrally and upwardly from the upper wall 81m of the battery case main unit 81. The upward protrusions 111a, 111b, 111c are disposed, in FIG. 2, on the inside in the vehicle width direction of the left seat frame 64 and cooperate with the flange portion 81s disposed on the outside in the vehicle width direction of the seat frame 64 and the rear frame 66 to position the battery-related parts storage section 81d in the vehicle width direction. To dispose the upward protrusions 111a, 111b, 111c on the inside in the vehicle width direction of the seat frame 64 and the flange portion 81s on the outside in the vehicle width direction of the seat frame 64 and the rear frame 66, the battery case main unit 81 needs only to be moved from a forward obliquely downward direction to a rearward obliquely upward direction relative to the seat frame 64 and the rear frame 66 when the battery case main unit 81 is to be assembled to the vehicle body frame 11. In FIG. 5, reference symbol 111d denotes a wire outlet port from which a plurality of wires is routed from the inside of the battery case main unit 81 to the outside and is disposed at the front portion corner portion of the battery-related parts storage section 81d with triangular shape. Reference symbol 111e denotes a wire holding portion that holds wires in position.

Figure 6:
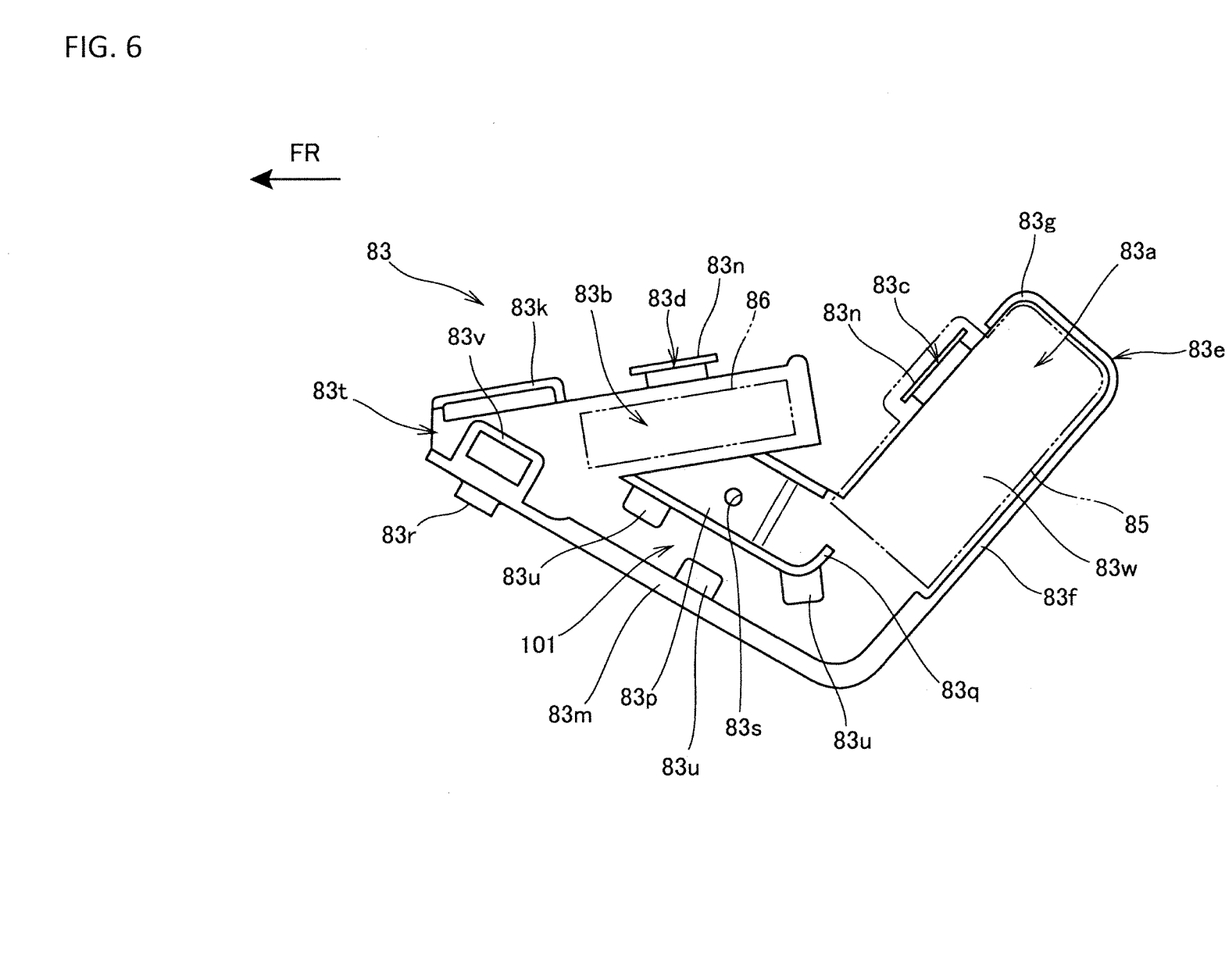
FIG. 6 is a side elevational view showing an embodiment of the sub-case.

FIG. 6 is a side elevational view showing the sub-case 83.

The sub-case 83 has a substantially triangular outline shape. The starter relay mounting portion 83a is disposed along a first side of the triangle, the fuse box mounting portion 83b is disposed along a second side of the triangle, and the wire passing space 101 is disposed along a third side of the triangle. The bottom wall 83p has a screw pass-through hole 83s formed at a central portion of the triangle. The screw 88 (see FIG. 3) is passed through the screw pass-through hole 83s. In addition, a wire outlet port 83t through which wires connected to the starter relay 85 and the fuse box 86 are routed to the outside of the sub-case 83 is disposed at a front portion corner portion of the triangle. In FIG. 6, reference symbols 83u, 83v denote wire holding tabs that hold in place wires passed through the inside of the wire passing space 101.

As shown in FIG. 2, the sub-case 83 is disposed in the battery case main unit 81 and in a triangular second space 103 defined by the seat frame 64, the rear frame 66, and the battery 73. As shown in FIGS. 5 and 6, inside the sub-case 83, the starter relay mounting portion 83a is disposed along the rear wall 81n that constitutes the battery-related parts storage section 81d of the battery case main unit 81 and the fuse box mounting portion 83b is disposed along the upper wall 81m that constitutes the battery-related parts storage section 81d.

A mounting procedure for the battery case 75 described heretofore will be described below.

Figure 7:
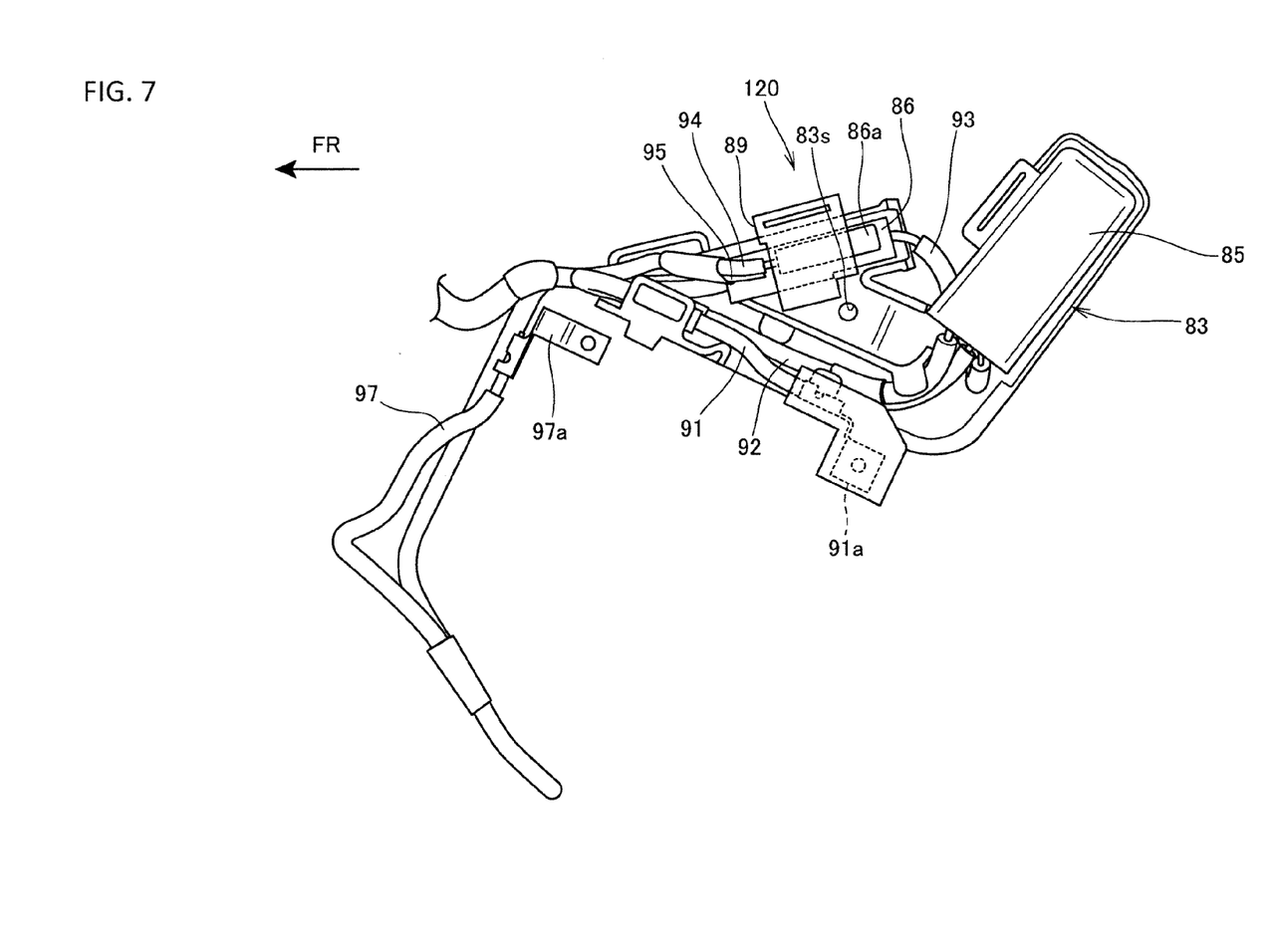
FIG. 7 is a first working diagram showing an example of a mounting procedure for the battery case.
Figure 8:
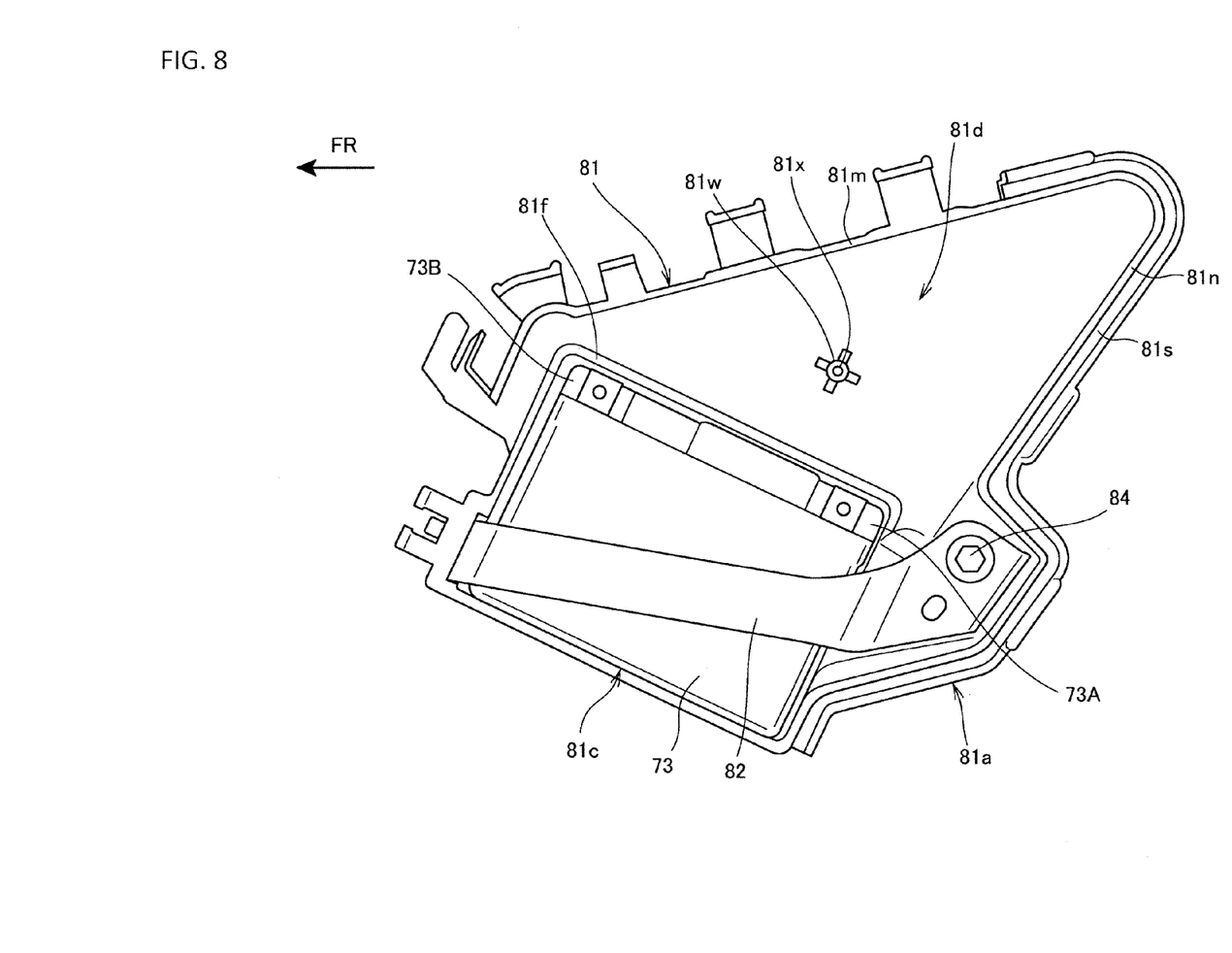
FIG. 8 is a second working diagram showing an example of a mounting procedure for the battery case.

FIG. 7 is a first working diagram showing the mounting procedure for the battery case 75, illustrating a subassembling procedure of the sub-case 83. FIG. 8 is a second working diagram showing the mounting procedure for the battery case 75, illustrating a procedure for mounting the subassembled sub-case 83 on the battery case main unit 81.

As shown in FIG. 7, the starter relay 85 and the fuse box 86 are mounted on the sub-case 83 and the conducting wires 91 to 95, 97 are connected to the starter relay 85 and the fuse box 86 in advance. Specifically, the starter relay 85 and the fuse box 86 are wired to each other; in addition, one ends of wires connecting the starter relay 85 and the fuse box 86 to the battery 73 are connected to the starter relay 85 and the fuse box 86, thereby a battery-related parts subassembly 120 is subassembled.

As shown in FIG. 8, the battery case main unit 81 is mounted on the vehicle body frame 11. Next, the battery 73 is stored in the battery storage section 81c of the battery case main unit 81 and the battery 73 is fixed in place by tightening the bolt 84 on the battery fixing bracket 82.

Then, in FIGS. 7 and 8, the subassembled battery-related parts subassembly 120 is disposed in the battery-related parts storage section 81d of the battery case main unit 81. At this time, the screw pass-through hole 83s in the sub-case 83 is aligned with the screw hole 81x in the battery case main unit 81 and then the screw 88 is inserted in the screw pass-through hole 83s and threaded into the screw hole 81x to thereby fix the battery-related parts subassembly 120 to the battery case main unit 81. Then, the conducting wires are connected to, for example, the battery 73, the starter motor, and the starter switch to complete wire connections. This completes the mounting of the battery case 75 and the battery-related parts 74 (see FIG. 3).

Figure 9:
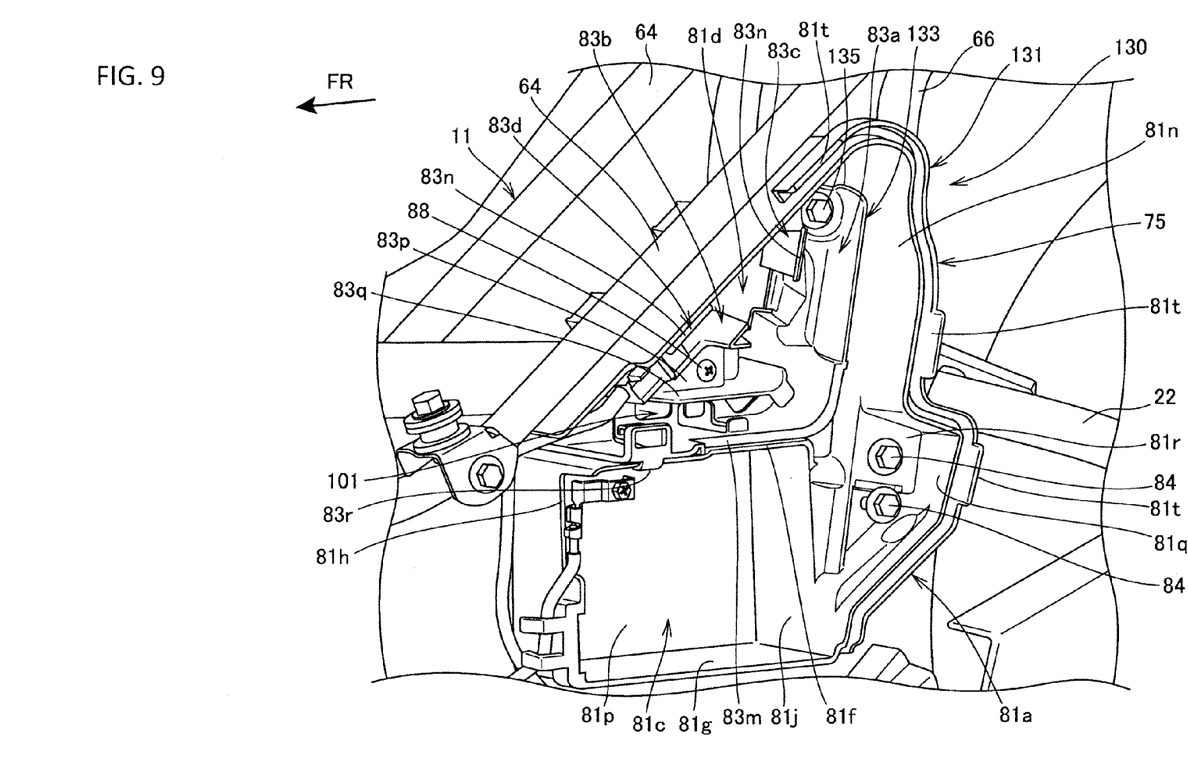
FIG. 9 is a perspective view showing a battery case structure according to another embodiment of the present invention.

FIG. 9 is a perspective view showing a battery case structure according to a second embodiment of the present invention. Like or corresponding parts are identified by the same reference symbols as those used in FIG. 4 for the first embodiment of the present invention and descriptions for those parts will be omitted.

A battery case 130 includes a battery case main unit 131, a battery fixing bracket 82 (see FIG. 3), and a sub-case 133. The battery fixing bracket 82 fixes a battery 73 (see FIG. 3) stored in the battery case main unit 131. The sub-case 133 fixes battery-related parts 74 (see FIG. 3) in the battery case main unit 131. Relative to the battery case 75 shown in FIG. 4, the second embodiment differs only in a method of fastening the battery case 130 to the side of the vehicle body frame 11. Specifically, with the battery case 130, a bolt 135 is added to the battery case 75 to thereby fasten the battery case main unit 131 jointly with the sub-case 133 to the side of the vehicle body frame 11.

Figure 10:
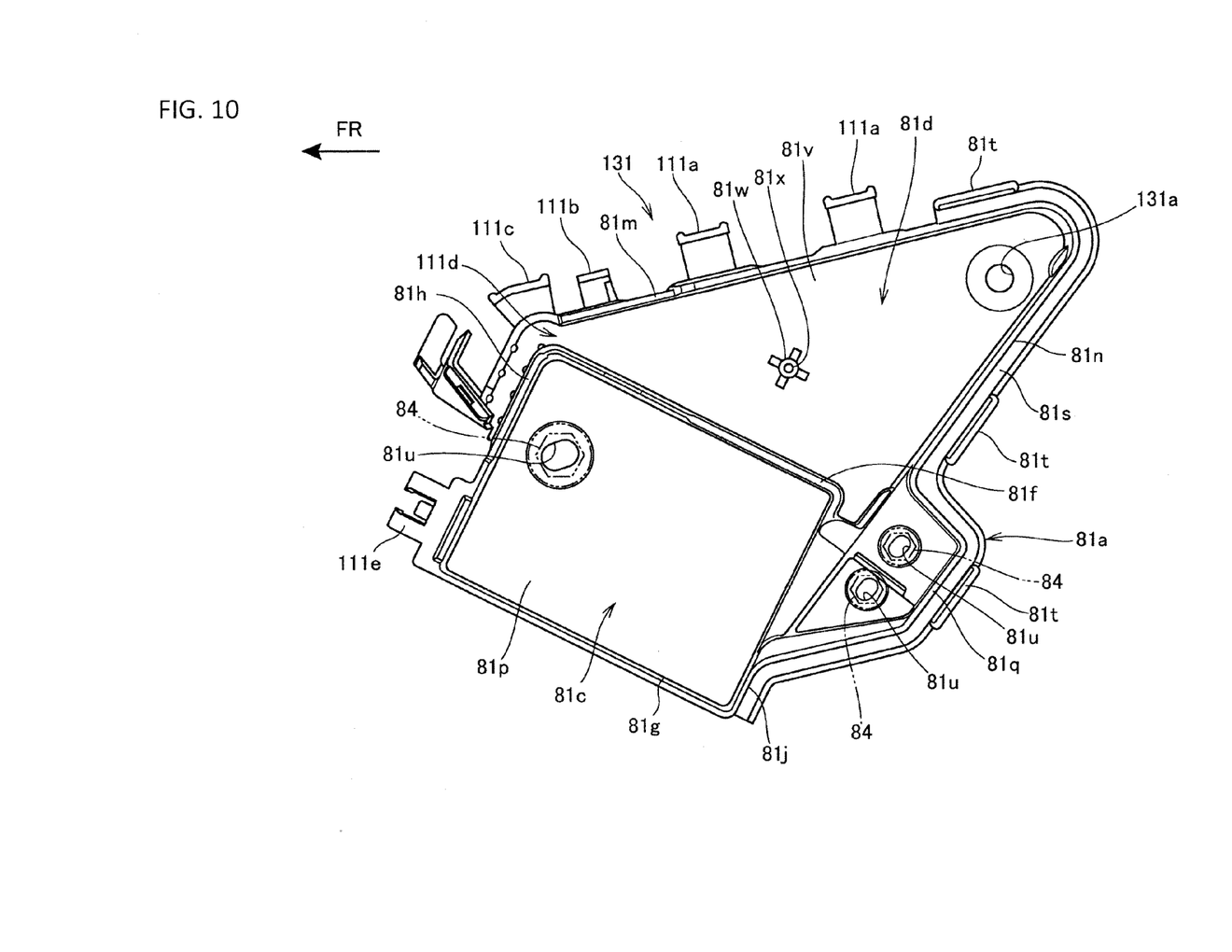
FIG. 10 is a side elevational view showing another embodiment of a battery case main unit.
Figure 11:
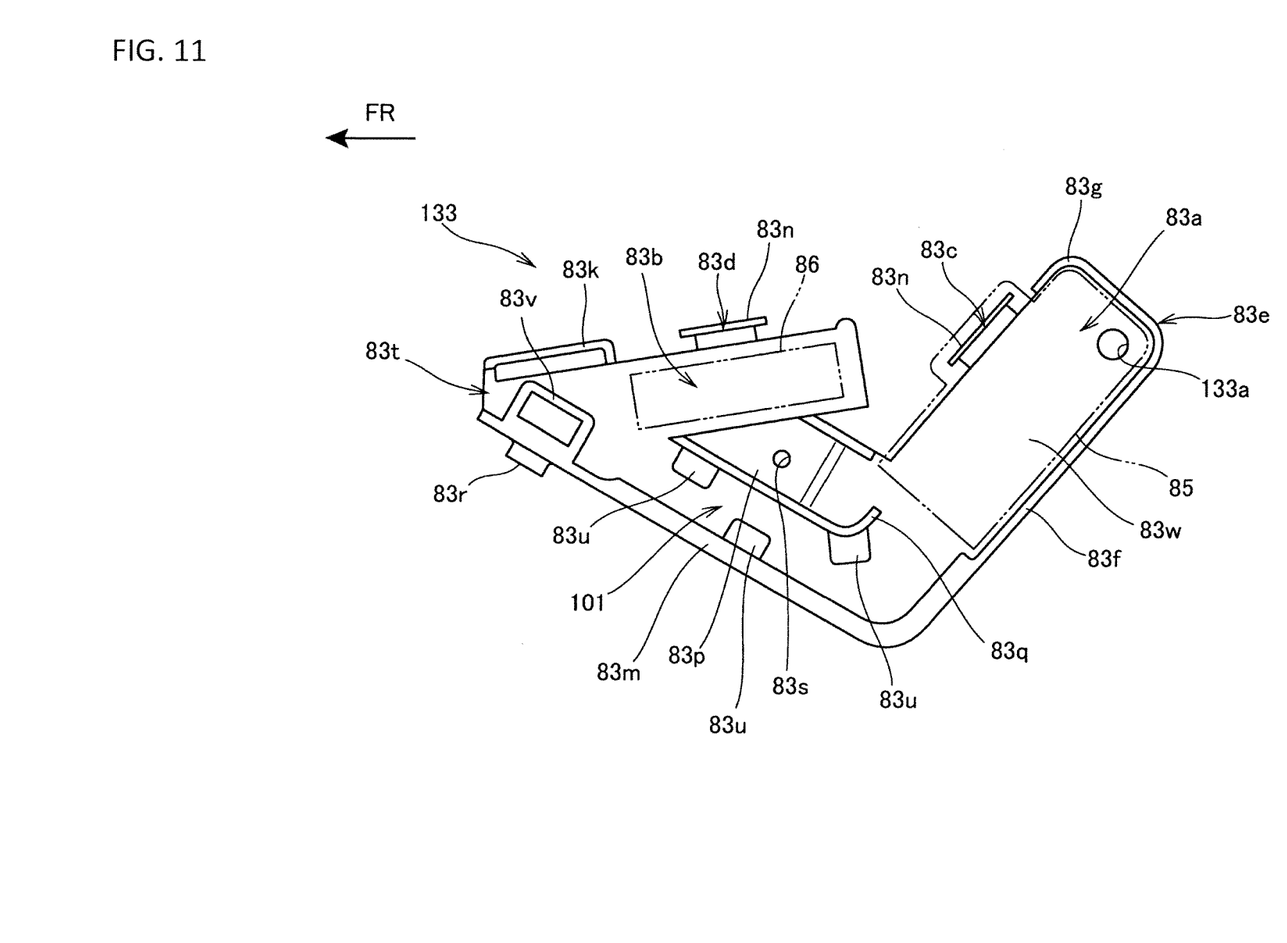
FIG. 11 is a side elevational view showing another embodiment of a sub-case.

FIG. 10 is a side elevational view showing the battery case main unit 131. FIG. 11 is a side elevational view showing the sub-case 133.

As shown in FIG. 10, the battery case main unit 131 differs from the battery case main unit 81 (see FIG. 5) in that a bolt pass-through hole 131a is drilled in a bottom wall 81v of a battery-related parts storage section 81d, specifically, at a position near a corner portion of an upper rear portion of the bottom wall 81v.

As shown in FIG. 11, the sub-case 133 differs from the sub-case 83 (see FIG. 6) in that a bolt pass-through hole 133a is drilled in a bottom wall 83w of a starter relay mounting portion 83a, specifically, at a position near a corner portion of a rear portion of the bottom wall 83w.

As shown in FIG. 9, jointly fastening the battery case main unit 131 and the sub-case 133 to the side of the vehicle body frame 11 with the bolt 135 allows the rear upper portions of the battery case main unit 131 and the sub-case 133 to be rigidly fixed in place, which contains play due to vehicle vibrations.

As shown in FIGS. 1, 3, and 4, in the battery case structure for the motorcycle 10, the structure includes the battery case 75 for storing therein the battery 73 to be mounted in the motorcycle 10. The battery-related parts 74 (the starter relay 85 and the fuse box 86), such as a relay, are connected to the battery 73. The starter relay mounting portion 83a and the fuse box mounting portion 83b as the related parts mounting portions in which the related parts 74 are disposed relative to the battery case 75 are provided s shown. The sub-case 83 that includes the starter relay mounting portion 83a and the fuse box mounting portion 83b is disposed near the battery 73, on the inside of the battery case main unit 81.

The arrangement in which the sub-case 83 includes the starter relay mounting portion 83a and the fuse box mounting portion 83b allows the starter relay 85 and the fuse box 86 to be previously subassembled in the sub-case 83 and the starter relay 85 and the fuse box 86 to be wired to each other and the starter relay 85 and the fuse box 86 to be wired to the battery 73 to complete a subassembly, before the subassembled sub-case 83 being mounted in the battery case main unit 81 to complete the wiring and other work. A structure that simplifies mounting of the starter relay 85 and the fuse box 86, while disposing the starter relay 85 and the fuse box 86 close to the battery 73, can thus be provided.

As shown in FIGS. 3, 5, and 6, the upper wall 81f, the upper wall 81m, and the rear wall 81n as the inner walls of the battery case main unit 81 are configured such that the lower portion outer wall portion 83m, the upper portion outer wall portion 83k, and the rear portion outer wall portion 83f as the outer walls of the sub-case 83 contact the abovementioned inner walls to thereby enable the screw pass-through hole 83s as the connecting hole in the sub-case 83 to be aligned with the screw hole 81x as the connecting hole in the battery case main unit 81. This arrangement facilitates, during a manufacturing process, positioning of the sub-case 83 relative to the battery case main unit 81. The arrangement also allows the battery case main unit 81 and the sub-case 83 to be fastened to each other by inserting, for example, the screw 88 into the screw pass-through hole 83s and the screw hole 81x immediately following the positioning of the sub-case 83 relative to the battery case main unit 81, which contributes to easy manufacturing. Productivity of the battery case 75 can thus be enhanced.

The sub-case 83 is disposed upwardly of the battery 73 in the battery case main unit 81. Disposing the heavy battery 73 at a lower portion in the battery case 75 achieves a lower center of gravity of the motorcycle.

As shown in FIGS. 1 and 2, the battery case 75 is disposed downwardly of the seat 27 as the seating portion. This arrangement allows the heavy battery 73 to be disposed at the center of the motorcycle (specifically, the center in the vehicle longitudinal direction), permitting integration of mass.

As shown in FIG. 3, the sub-case 83 includes the starter relay mounting portion 83a and the fuse box mounting portion 83b such that the starter relay mounting portion 83a and the fuse box mounting portion 83b extend along the inner wall surfaces of the battery case main unit 81, specifically, the rear wall 81n and the upper wall 81m, respectively. This arrangement simplifies connection between the starter relay 85 and the fuse box and facilitates positioning of the sub-case 83 relative to the battery case main unit 81. Since the starter relay 85 and the fuse box 86 are not widely apart from each other, the wiring can be shorter and connection can be made easier. Thermal effect or other effect can also be contained between the starter relay 85 and the fuse box 86.

As shown in FIGS. 1 and 2, the battery case 75 is disposed in the first space 78 sandwiched between the seat frame 64 extending longitudinally for supporting the seat 27 and the rear frame 66 extending upwardly in the rearward direction from a downward position of the motorcycle, and the sub-case 83 is disposed in the triangular second space 103 defined by the seat frame 64, the rear frame 66, and the battery 73 within the battery case 75. The first space 78 sandwiched between the seat frame 64 and the rear frame 66 forms a triangular shape, and the first space 78 is typically a dead space. Disposing the battery case 75 in the first space 78 is preferable for the motorcycle 10 in which the disposition space is at a premium. Moreover, disposing the sub-case 83 in the triangular second space 103 that is left after the battery 73 has been disposed in the battery case main unit 81 permits effective use of the dead space.

If a triangular space is used for a storage space, corners of the triangle are not generally used. In the embodiments of the present invention, however, the sub-case 83 having a substantially triangular shape is disposed in the triangular second space 103, so that the second space 103 can be more effectively used.

It is understood that the embodiments described heretofore are for illustrative purposes only and that various modifications or changes in light thereof will be suggested to one skilled in the art without departing from the scope of the present invention.

For example, in the first embodiment of the present invention described above, the starter relay mounting portion 83a is disposed on the side adjacent to the rear portion outer wall portion 83f of the sub-case 83 and the fuse box mounting portion 83b is disposed on the side adjacent to the upper portion outer wall portion 83k of the sub-case 83. This is, however, not the only possible arrangement; alternatively, the starter relay mounting portion 83a is disposed on the side adjacent to the upper portion outer wall portion 83k of the sub-case 83 and the fuse box mounting portion 83b is disposed on the side adjacent to the rear portion outer wall portion 83f of the sub-case 83.

Additionally, the present invention may be applied to, in addition to the motorcycle 10, saddle riding type vehicles including types of vehicles other than the motorcycle.

DESCRIPTION OF REFERENCE SYMBOLS

10: Motorcycle
27: Seat (seating portion)
73: Battery
74: Battery-related parts
75: Battery case
78: First space
81, 131: Battery case main unit (main unit)
81f, 81m, 81n: Inner wall of battery case main unit (inner wall of main unit)
81x: Screw hole (connecting hole)
83, 133: Sub-case
83a: Starter relay mounting portion (battery-related parts mounting portion)
83b: Fuse box mounting portion (battery-related parts mounting portion)
83f, 83k, 83m: Outer wall of sub-case
83s: Screw pass-through hole (connecting hole)
85: Starter relay
86: Fuse box
103: Second space

The invention claimed is:

1. A battery case structure for a motorcycle, said battery case structure comprising:
a battery case configured to store therein a battery to be mounted in a motorcycle;
related parts, including a relay, configured to be connected to the battery;
related parts mounting portions in which the related parts are disposed relative to the battery case; and
a sub-case disposed near the battery on an inside of a main unit of the battery case, the sub-case including the related parts mounting portions,
wherein the main unit of the battery case includes inner walls configured such that outer walls of the sub-case contact the inner walls to enable a connecting hole in the sub-case and a connecting hole in the main unit to be aligned with each other.

2. The battery case structure for a motorcycle according to claim 1, wherein the sub-case is disposed upwardly of the battery in the main unit of the battery case.

3. The battery case structure for a motorcycle according to claim 2, wherein the battery case is disposed downwardly of a seating portion.

4. The battery case structure for a motorcycle according to claim 1, wherein the sub-case includes the related parts mounting portions such that the related parts mounting portions extend along inner wall surfaces of the main unit of the battery case.

5. The battery case structure for a motorcycle according to claim 1, wherein
the battery case is disposed in a first space sandwiched between a seat frame extending longitudinally for supporting the seating portion and a rear frame extending upwardly in a rearward direction from a downward position of the motorcycle, and
wherein the sub-case is disposed in a triangular second space defined by the seat frame, the rear frame, and the battery within the battery case.

6. A battery case structure for a vehicle, said battery case structure comprising:
case means for storing therein a battery to be mounted in a vehicle;
component means for being connected to the battery;
component mounting means for supporting the component means relative to the case means; and
sub-case means disposed near the battery on an inside of a main unit of the case means, the sub-case means including the component mounting means thereupon,
wherein the main unit of the case means includes inner wall means for contacting outer walls of the sub-case means, to thereby enable a connecting hole in the sub-case means and a connecting hole in the main unit to be aligned with each other.

7. A battery case structure for a vehicle according to claim 6, wherein the sub-case means is disposed upwardly of the battery in the main unit of the case means.

8. The battery case structure for a vehicle according to claim 7, wherein the case means is disposed downwardly of a seating means, said seating means for supporting a rider thereupon.

9. The battery case structure for a vehicle according to claim 6, wherein the sub-case means includes the component mounting means thereupon, such that the component mounting means extend along inner wall surfaces of the main unit of the case means.

10. The battery case structure for a vehicle according to claim 6, wherein the case means is disposed in a first space sandwiched between a seat frame means extending longitudinally for supporting the seating means and a rear frame means extending upwardly in a rearward direction from a downward position of the vehicle, and
wherein the sub case means is disposed in a triangular second space defined by the seat frame means, the rear frame means, and the battery within the case means.

* * * * *